United States Patent
Kerr et al.

(10) Patent No.: US 6,965,615 B1
(45) Date of Patent: Nov. 15, 2005

(54) PACKET STRIPING ACROSS A PARALLEL HEADER PROCESSOR

(75) Inventors: Darren Kerr, Palo Alto, CA (US); Jeffery Scott, Durham, NC (US); John William Marshall, Cary, NC (US); Scott Nellenbach, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

(21) Appl. No.: 09/663,777

(22) Filed: Sep. 18, 2000

(51) Int. Cl.$^7$ ............................................. H04J 3/24
(52) U.S. Cl. .................. 370/474; 370/535; 370/536; 370/537; 710/3
(58) Field of Search .................. 370/351, 389, 370/392, 411–419, 474, 465, 535–540; 710/3, 710/4

(56) References Cited

U.S. PATENT DOCUMENTS

| | | | |
|---|---|---|---|
| 5,115,436 A * | 5/1992 | McAuley ..................... 714/781 |
| 6,101,599 A | 8/2000 | Wright et al. | |
| 6,119,215 A | 9/2000 | Key et al. | |
| 6,151,644 A * | 11/2000 | Wu ............................. 710/52 |
| 6,160,819 A * | 12/2000 | Partridge et al. ........... 370/474 |
| 6,195,739 B1 | 2/2001 | Wright et al. | |
| 6,272,621 B1 | 8/2001 | Key et al. | |
| 6,493,347 B2 * | 12/2002 | Sindhu et al. .............. 370/401 |
| 6,505,269 B1 | 1/2003 | Potter | |
| 6,513,108 B1 | 1/2003 | Kerr et al. | |
| 6,665,755 B2 * | 12/2003 | Modelski et al. ........... 710/100 |

OTHER PUBLICATIONS

U.S. Appl. No. 09/432,526, filed Nov. 3, 1999, Fredenburg et al.
U.S. Appl. No. 09/663,775, filed Sep. 18, 2000, Kerr et al.

* cited by examiner

*Primary Examiner*—Steven Nguyen
*Assistant Examiner*—Roberta Shand
(74) *Attorney, Agent, or Firm*—Cesari and McKenna, LLP (57) ABSTRACT

A technique is provided for striping packets across pipelines of a processing engine within a network switch. The processing engine comprises a plurality of processors arrayed as pipeline rows and columns embedded between input and output buffers of the engine. Each pipeline row or cluster includes a context memory having a plurality of window buffers of a defined size. Each packet is apportioned into fixed-sized contexts corresponding to the defined window size associated with each buffer of the context memory. The technique includes a mapping mechanism for correlating each context with a relative position within the packet, i.e., the beginning, middle and end contexts of a packet. The mapping mechanism facilitates reassembly of the packet at the output buffer, while obviating any any out-of-order issues involving the particular contexts of a packet.

5 Claims, 4 Drawing Sheets

PACKET STRIPING ACROSS A PARALLEL HEADER PROCESSOR

CROSS-REFERENCE TO RELATED APPLICATIONS

This invention is related to copending U.S. patent application Ser. No. 09/663,775 titled, Sequence Control Mechanism for Enabling Out of Order Context Processing, filed on even date herewith and assigned to the assignee of the present invention.

FIELD OF THE INVENTION

The present invention relates to computer systems and, more, specifically, to a technique for striping packets across a parallel processor computer system.

BACKGROUND OF THE INVENTION

A systolic array provides a common approach for increasing processing capacity of a computer system when a problem can be partitioned into discrete units of works. In the case of a one dimensional systolic array comprising a single "row" of processing elements or processors, each processor in the array is responsible for executing a distinct set of instructions on input data before passing it to a next element of the array. To maximize throughput, the problem is divided such that each processor requires approximately the same amount time to complete its portion of the work. In this way, new input data can be "pipelined" into the array at a rate equivalent to the processing time of each processor, with as many units of input data being processed in parallel as there are processors in the array. Performance can be improved by adding more elements to the array as long as the problem can continue to be divided into smaller units of work. Once this dividing limit has been reached, processing capacity may be further increased by configuring multiple rows in parallel, with new input data allocated to the first processor of a next row of the array in sequence.

Typically, such a parallel processor systolic array lacks the buffering capability to handle "large" amounts of data, such as Internet protocol (IP) packets, despite having the required processing power. Accordingly, only portions of the packets are forwarded to the array for processing, while the remaining portions are buffered external to the array. This arrangement relegates the systolic array as an "out-of-band" processor. An example of such an out-of-band systolic array is the processing engine disclosed in U.S. patent application Ser. No. 09/106,478 titled Programmable Arrayed Processing Engine Architecture for a Network Switch, by Darren Kerr et al., which application is hereby incorporated by reference as though fully set forth herein. The processing engine generally comprises an array of processors embedded among an input header buffer (IHB) and an output header buffer (OHB) of a network switch. The processors are symmetrically arrayed as rows and columns, wherein the processors of each row are configured as stages of a pipeline that sequentially execute operations on data passed serially among the processors.

A buffer and queuing unit (BQU) is coupled between the processing engine and a plurality of line cards comprising physical interface ports of the switch. The BQU contains buffers for temporarily storing data, such as IP packets, received from the line cards; thereafter, the BQU delivers portions of those packets to the IHB and stores the remaining portions on a packet memory. The IHB receives the packet portions and distributes them among the parallel pipeline rows for processing by the constituent processors. The OHB receives the processed portions from the pipeline rows and forwards them off the processing engine to the BQU, where they are appended to the remaining packet portions. The packets are then forwarded over appropriate physical interface ports of the line cards from the switch.

When receiving packets from the line cards, the BQU may extract a header from each packet and construct a "context" comprising control information and, e.g., the extracted header. Each context is then forwarded to the IHB for distribution to the processors of the engine. Each context comprises a fixed amount of information that is typically less than that of a packet and that represents a maximum size for which each processor is optimally configured to process. Since contexts are generally smaller than packets, the BQU requires relatively large amounts of storage capabilites to buffer the remaining "payloads" of the packets. These buffering capabilities are external to the processing engine and, as noted, function to relegate the processing engine as an out-of-band processor.

However, the processing engine may be further configured to perform "light" processing on the entire packet, rather than just the packet header. Light processing denotes that the time (i.e., the number of cycles) needed by a processor to process an entire packet is sufficient to meet the rate at which the contexts are provided to the processors of the rows. In other words, the processor can process the context associated with an entire packet (both the packet header and payload) at "line rate". For this configuration, performance of the processing engine may be enhanced by eliminating external buffering of the packets and, accordingly, the latencies associated with such buffering. Elimination of the external buffering, in turn, may obviate the need for the BQU and memory used to store the packet payloads.

SUMMARY OF THE INVENTION

The present invention comprises a technique for striping packets across pipelines of a processing engine within a network switch. The processing engine comprises a plurality of processors arrayed as pipeline rows and columns embedded between input and output buffers of the engine. Each pipeline row or cluster includes a context memory having a plurality of "window" buffers of a defined size. According to the packet striping technique, each packet is apportioned into fixed-sized contexts corresponding to the defined window size associated with each buffer of the context memory. The technique further includes a mapping mechanism for correlating each context with a relative position within the packet, i.e., the beginning, middle and end contexts of a packet. The mapping mechanism facilitates reassembly of the packet at the output buffer, while obviating any out-of-order issues involving the particular contexts of a packet.

In the illustrative embodiment, the processing engine may accept packets of any length by segmenting them into fixed size contexts at the input buffer and then sequentially passing the contexts to the clusters of processors. A program counter (PC) entry point function provides the mapping needed to indicate to the processors whether the context is the first, last or an intermediate portion of the entire packet. Since contexts are sequentially assigned to the clusters of the engine, each processor of a cluster "knows" that its neighboring clusters (i.e., in rows directly above and below it) are processing contexts of a packet that are previous and subsequent to its assigned context. Each processor of a cluster processes its assigned context and communicates intermediate results, such as any state or status information relating to processing of contexts, among the neighboring clusters by way of an intercolumn communication mechanism of the processing engine.

Advantageously, the invention enables buffering of packet contexts within the processing engine while avoiding over-utilization of the processing engine's external memory bandwidth. That is, the packet striping technique of the present invention utilizes the fixed size buffering in the clusters to enable entire packet processing while reducing, or possibly eliminating, external buffering for the processors of the clusters. For packets of a predetermined size, the processing engine may require no external bandwidth for packet buffering. In those cases where bandwidth is required, the utilized bandwidth is limited to the difference between the predetermined packet size and a maximum size of each context.

By exploiting certain features of the inventive packet striping technique, performance of the processing engine is enhanced by substantially reducing external buffering required for the processors. These features include sequential ordering of contexts assigned to the parallel clusters of processors, along with the ability to signal starting code locations for execution by the processors and the ability of a processor to communicate with any other processor in the processing engine. Collectively, these features enable the processors of the processing engine to function as a "bump in the wire" (i.e., for in-line processing) rather than as an out-of-band processor requiring external buffering when processing contexts.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
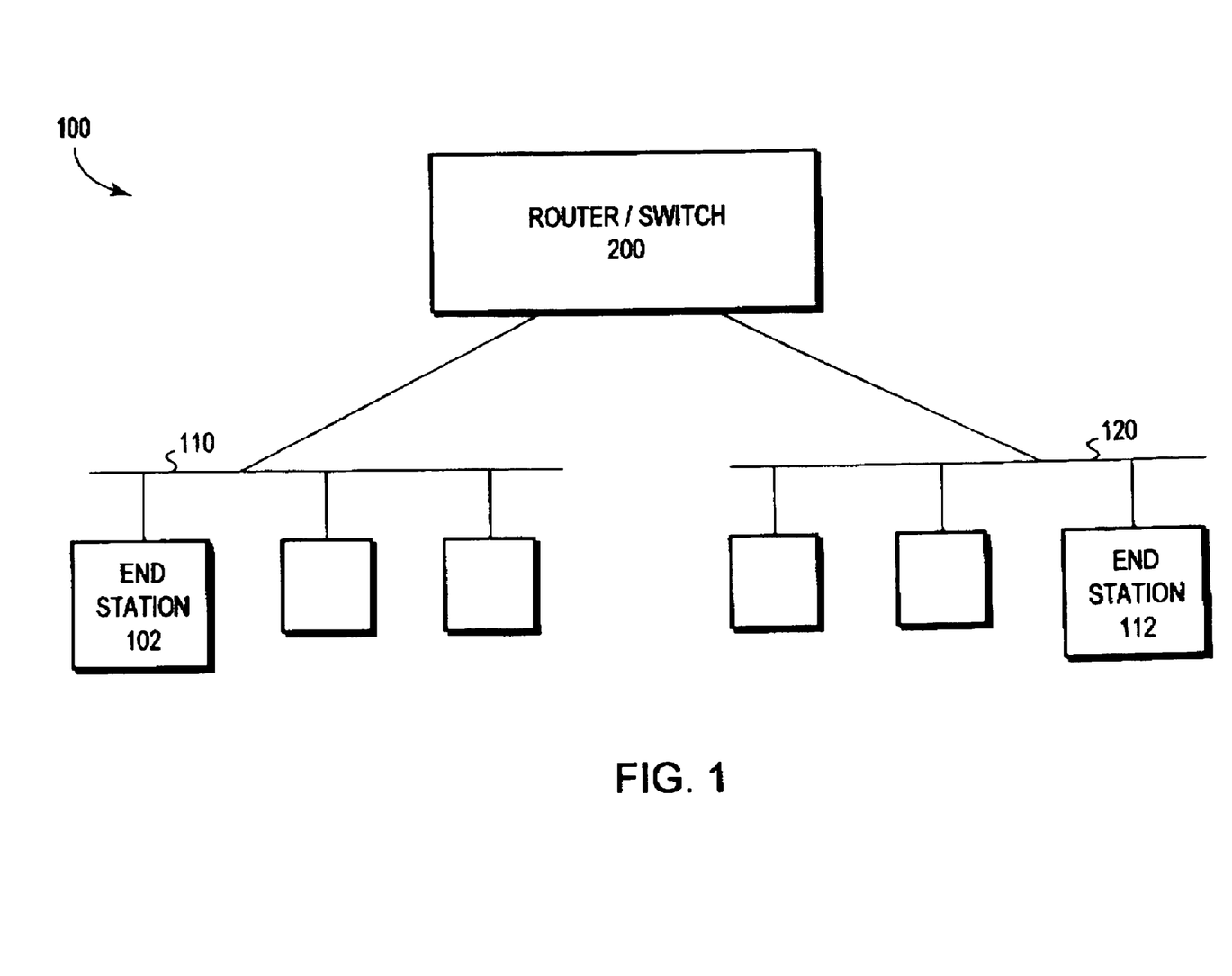
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising endstations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating stations according to a predefined protocol. For the illustrative embodiment described herein, the predefined protocol is the Internet protocol (IP), although the invention could be implemented with other protocols, such as the Internet Packet Exchange, AppleTalk or DECNet protocols.

Figure 2:
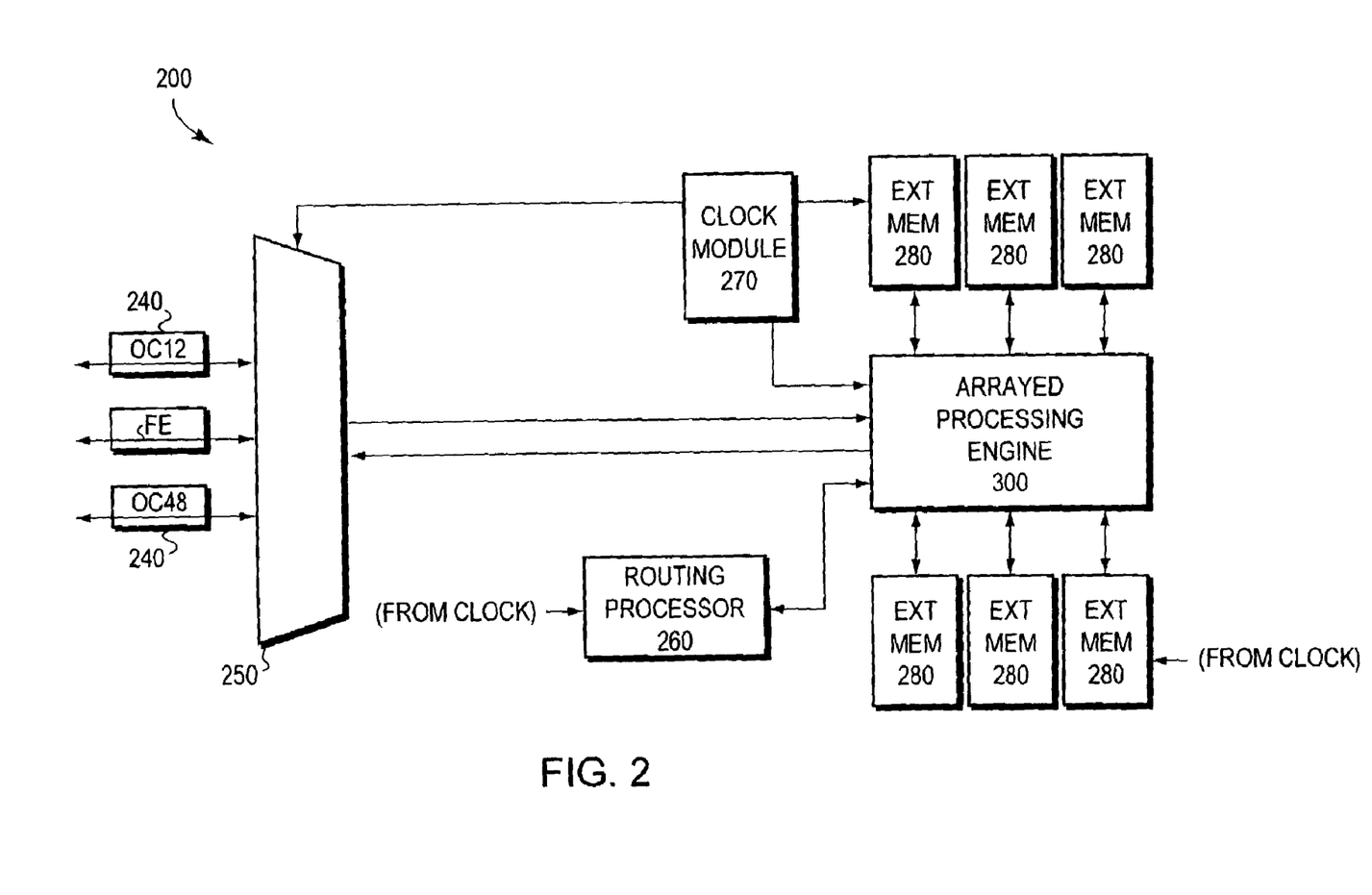
FIG. 2 is a schematic block diagram of intermediate station, such as a network switch, that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the architecture described herein is the ability to program the station for execution of layer 2, layer 3 or higher-layer operations. Operation of the switch will be described with respect to IP switching of packets, although the switch may be programmed for other applications, such as data encryption.

The switch 200 comprises a plurality of interconnected components including an arrayed processing engine 300, various memories and network port interface cards 240. Operations of these components are preferably synchronously controlled by a clock module 270 although the arrayed elements of the processing engine may be operatively configured to function asynchronously. The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 300 is coupled to a memory partitioned into a plurality of external memory (Ext Mem) resources 280 and to a plurality of interface cards 240 via a selector circuit 250. Incoming packets to the switch are received at the interface cards 240 and provided to the processing engine via the selector 250. The interface cards 240 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces. The processing engine 300 generally functions as a switching processor that modifies packets and/or headers.

A routing processor 260 executes conventional routing protocols for communication directly with the processing engine 300. The routing protocols generally comprise topological information exchanges between intermediate stations to determine preferred paths through the network based on, e.g., destination IP addresses. These protocols provide information used by the processor 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
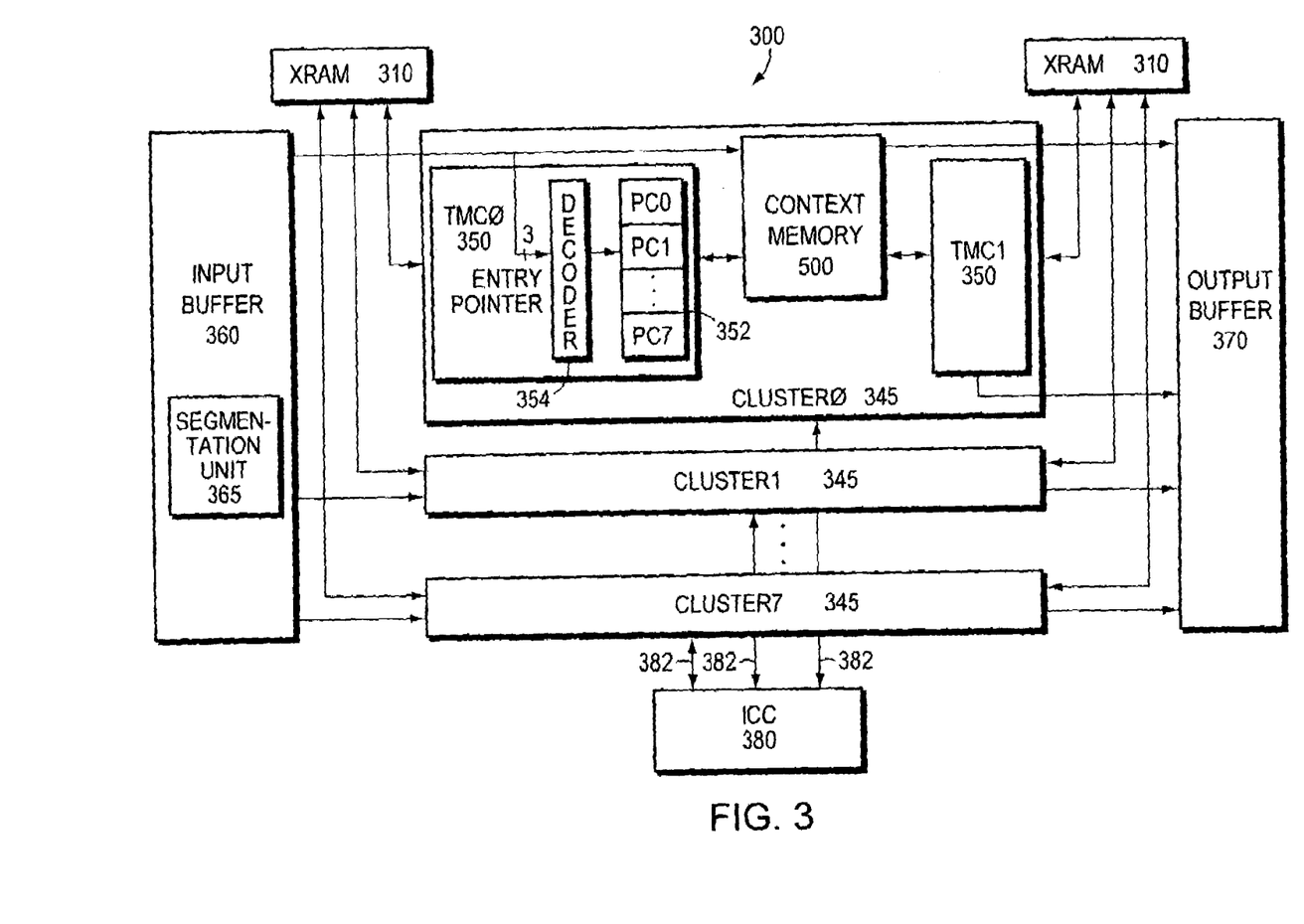
FIG. 3 is a schematic block diagram of a programmable arrayed processing engine having a plurality of processors configured as clusters.

FIG. 3 is a schematic block diagram of the programmable processing engine 300 which comprises an array of processors embedded between input and output buffers with a plurality of interfaces 310 from the array to partitions of an external memory. The external memory stores non-transient data organized within data structures for use in processing transient ("context") data described herein. The non-transient data typically includes "table" data contained in forwarding and routing tables, statistics, access filters, encryption keys and/or queuing information. The transient data enters and exits the engine via 200 MHz 64-bit input and output data interfaces. A remote processor interface (not shown) provides information, such as instructions and data, from a remote processor to the processors and buffers over a maintenance bus having multiplexed address/data lines.

The processing engine 300 comprises a plurality of processors 350 arrayed into multiple rows and columns that may be further configured as a systolic array. In the illustrative embodiment, the processors are arrayed as eight (8) rows and two (2) columns in an 8×2 arrayed configuration that is embedded between an input buffer 360 and an output buffer 370. However, it should be noted that other arrangements, such as 4×4 or 8×1 arrayed configurations, may be advantageously used with the present invention. The processors of each row are connected to a context memory 500; collectively, these elements of the row are organized as a cluster 345.

Each processor is a customized, single-threaded microcontroller (TMC) 350 having a dense structure that enables implementation of similar processors on an application specific integrated circuit. The present invention may apply to any number of processors within a column of the arrayed engine and, alternatively, to a single processor with multiple threads of execution. The TMC 350 is preferably a pipelined processor that includes, inter alia, a plurality of arithmetic logic units (ALUs) and a register file having a plurality of general purpose registers that store intermediate result information processed by the ALUs.

The processors (TMC 0,1) of each cluster 345 execute operations on the transient data loaded into the context memory 500 by the input buffer 360, whereas the processors of each column operate in parallel to perform substantially the same operation on the transient data, but with a shifted phase. The processors of a cluster inherently implement first in, first out (FIFO) ordering primarily because there is no mechanism for bypassing processors within the cluster. Each processor participates in a "software pipeline" phase and if processing by one processor of a cluster stalls (i.e., is delayed), all processors in that cluster are delayed. This arrangement can create undesired dependencies if all phases do not complete within a maximum interval and the transient data are unrelated.

In addition to storing the transient data flowing through the cluster, the context memory 500 stores pointers that reference data structures and tables stored in, e.g., Ext Mem 280 for use by the TMC 350. Each Ext Mem 280 is coupled to an external memory (XRAM) controller 310 which, in the illustrative embodiment, is preferably embodied as a 200 MHz external memory interface coupled to a column of processors. The controller is configured to enable columned processor access to the non-transient data stored in the external column memory. The shared Ext Mem 280 accessed by the processors may further comprise entries of data structures, such as tables, that are constantly updated and accessed by the processors of each column. An example of such a table structure is the FIB table used by the processing engine to perform forwarding operations.

Notably, there is a fixed amount of external memory bandwidth available to the processing engine. In accordance with the invention, a packet striping technique is provided that strives to utilize that external memory bandwidth primarily for control information exchanges and secondarily for data buffering functions. If the external memory bandwidth is used for data buffering, then the maximum throughput of the processing engine is defined by that memory bandwidth and not the input/output buffering capability of the engine.

As described further herein, each context memory 500 is organized into a plurality of "window" buffers of a defined size. The processing engine is capable of receiving and processing an entire, full packet through the use of the defined window size of each context memory, wherein the window size essentially specifies the size of a context processed by the engine. For example, each context memory may be configured to store 8,000 (i.e., 8K) bytes, yet the window size may be configured to specify a size of 256 bytes. That is, the 8K-byte context memory may be partitioned into 256 byte windows capable of buffering contexts having a fixed size of 256 bytes.

For each received packet, the input buffer 360 builds a context from the transient data for processing by the clusters. To that end, the input buffer includes a segmentation unit 365 that "sizes" each packet received at the processing engine by counting the data bytes of the packet. The segmentation unit preferably comprises conventional logic circuitry, such as counters and registers, used for determining when the number of bytes exceeds the defined window size (e.g., 256 bytes), and then constructing a context of that defined size. That is, the segmentation unit operates to essentially segment the packet into a series of contexts, each having a size corresponding to the defined window.

Figure 4:
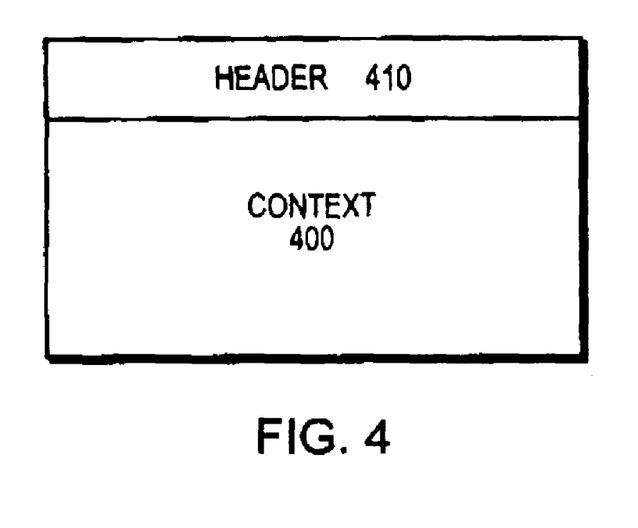
FIG. 4 is a schematic block diagram of a context adapted for processing by the programmable arrayed processing engine.

FIG. 4 is a schematic block diagram of a context 400 adapted for processing by the programmable arrayed processing engine 300. The context is defined by a predetermined number of bytes of data (comprising either the header of each packet or the entire packet) and includes an appended header 410. The input buffer distributes these fixed-sized contexts 400 to processors of the clusters in accordance with a sequential context distribution mode of the processing engine. According to an aspect of the present invention, the packet striping technique utilizes the bandwidth of the buses coupling the clusters to the input buffer 360, along with the buffering within the clusters (e.g., the context memories 500) to essentially eliminate the use of external memory 280 for data buffering purposes.

For example, assume a packet stream having a size of 1,024 bytes (i.e., 1 K bytes) is received at the segmentation unit 365 of the input buffer 360. The segmentation unit counts the incoming bytes of the packet and once it receives 256 bytes, it creates a first context (Context 1). The input buffer then forwards Context 1 to TMC0 of a first cluster, e.g., Cluster 0. The segmentation unit 365 then counts another 256 bytes of the input packet stream and creates a second context (Context 2). The input buffer then forwards Context 2 to TMC0 of a second cluster, e.g., Cluster 1. The segmentation unit continues to count these 256-byte "chunks" of transient data and transform them into contexts 400 for distribution to processors of the clusters 345 to thereby exploit the parallelism of the processing engine 300.

Once the segmentation unit divides the packet into fixed-size contexts for distribution to the various clusters of the processing engine, a mechanism is needed to identify each context as constituting the beginning, middle or end of the packet. According to another aspect of the invention, the packet striping technique utilizes a program counter (PC) entry point to identify each context transmitted to a processor of a cluster as either the beginning, middle or end context of a packet. This, in turn, informs the processor as to the relative placement of its context within a particular packet. The PC entry point is provided by the input buffer 360, along with each transmitted context 400, to the processor of a cluster, typically to instruct that processor where to start processing of that context in the next phase.

Each TMC processor includes a PC table 352 having eight entries PC0–PC7, each of which is accessible by a 3-bit PC entry pointer that is provided by the input buffer to the processor and that is transformed by decoder 354 to function as a PC index into the PC table 352. An example of a mechanism for programming a code entry point for a TMC processor that may be advantageously used herein is disclosed in commonly-assigned U.S. patent application Ser. No. 09/432,526 titled A Processor Isolation Technique for Integrated Multi-Processor Systems, by William Fredenburg et al., which application is hereby incorporated by reference as though fully set forth herein. The indexed PC table entry provides a starting address for the TMC processor to begin executing its program code at the start of a next phase when processing a particular context.

In the illustrative embodiment, the input buffer 360 has a notion of two PC entry points: a foreground pointer and a background pointer. If the input buffer does not receive any information (context) to transmit to a processor of a particular cluster in a next phase, the input buffer transmits a background pointer to the processor as its PC entry point for the next phase. The background pointer is a value specifying an entry of the PC table that the processor should use as a starting address for processing during that phase. In particular, the background pointer value is programmable and references a PC table entry that the processor programs to specify its background activity.

However if the input buffer has context to send to the processor during the next phase, the input buffer issues a foreground pointer to the processor. The foreground pointer references a PC table entry that is programmed as a starting address of program code executed by the processor when processing valid context data in accordance with its foreground execution path. Eight values are needed to reference each of the eight PC table entries and only two of those values are utilized to define the foreground and background pointers; therefore, six PC entry point values are available for use with a novel coding technique.

The coding technique maps the beginning, middle and end contexts of a packet to PC entry points provided to the processors of the clusters from the input buffer. The coding technique also provides a means for the input buffer to instruct a processor as to the starting address of its program code that should be executed when processing the particular context provided to the processor from the input buffer. Moreover, the mapping/coding technique enables control of the sequencing of contexts through the processing engine.

In the illustrative embodiment, the coding technique preferably utilizes the foreground entry point to define the start, middle and end contexts of a packet. Specifically, the foreground (F) pointer may be defined as the beginning context of a packet, the foreground pointer plus one (F+1) may be defined as a middle context and the foreground pointer plus two (F+2) may be defined as the end context of the packet. Thus a PC entry value of "1" denoting the foreground pointer defines the beginning context of a packet, whereas PC entry values of "2" (F+1) and "3" (F+2) define the middle and end contexts, respectively, of the packet. Of course, any other type of encoding may be utilized that can clearly identify the beginning, middle and end "chunks" of a packet.

The TMC processors use these values as indexes into their PC tables to determine the addresses at which they are to begin their processing. For example, the input buffer provides a context 400 to a processor along with a PC entry point value of "2" denoting that the context is a middle context of a packet. This value instructs the processor to execute a particular set of functions associated with that portion of the packet. Because it is processing a middle context of a packet, the processor may further have to request information from a neighboring processor in a previous row in order to process that context. According to the invention, the information may comprise an intermediate result associated with such processing.

As a further example, assume that a packet is segmented by the input buffer 360 and a beginning context is provided to a processor (TMC 0) of Cluster 0 which begins processing the context at time (t). Approximately eight cycles later (t+8) the input buffer transmits a middle context to TMC0 of Cluster 1. This latter processor may then invoke a messaging mechanism to request data (such as an intermediate result) from TMC0 of the previous cluster (Cluster 0). TMC0 of Cluster 1 may have to wait for the previous row (TMC0 of Cluster 0) to finish its processing in order to provide the requested intermediate result. This process continues with respect to subsequent contexts issued to subsequent clusters until the end context is provided to a particular processor of a particular cluster. The messaging mechanism may be used to pass important context related information (such as encryption keys) across rows of the processing engine without consuming any of the external memory bandwidth.

According to yet another aspect of the present invention, the messaging mechanism is an intercolumn communication (ICC) mechanism of the processing engine that enables communication of state and status information relating to processing of the contexts among neighboring processors of the engine. Referring again to FIG. 3, each processor of a cluster is coupled to an ICC block 380 of the processing engine over line 382 to enable the exchange of ICC messages among any processor of any column in the processing engine. The ICC block 380 generally comprises conventional logic circuitry adapted to forward data issued by a source processor to an address (such as an identifier) of a destination processor within the engine 300. Specifically, the source processor sends an ICC message to the ICC block 380, which informs the destination processor of the impending message. Each ICC message preferably comprises 32 bits of data and includes an address space capable of referencing any processor on the processing engine or, alternatively, processors on other processing engines. The data exchanged utilizing the ICC messaging mechanism typically comprises state or status information, as manifested by intermediate results.

The ICC mechanism is particularly advantageous when used with the sequential context distribution mode of the processing engine because each processor is aware of the position of the context it is processing within a packet relative to the contexts processed by its "neighbors". That is, each processor "knows" that a previous context is processed by the cluster directly "above" the processor while a subsequent context is processed by the cluster directly "below" it. This enables the processors to process their contexts and send messages to their neighboring processors via the ICC block 380 to exchange state and status information relating to the processed contexts. Upon completion of processing, each processor of a cluster forwards the processed context to the output buffer.

The sequential distribution of contexts among the clusters of the processing engine further imposes FIFO ordering among the contexts such that there is not need to distinguish among the middle contexts. In other words, all that is needed is identification of the beginning context of a packet, the middle contexts and the end context of that packet. Since the contexts are of a fixed sized, each processor can process its context at line rate without stalling or delay within its cluster. Moreover, no external memory buffering is required since the internal context memories and bandwidths of the clusters are used to accommodate the context of a packet.

Operationally, a start flag accompanies the first byte of the packet received at the input buffer 360 and a stop flag accompanies the last byte of that packet. By utilizing the PC entry points and passing those PC entry points to the output buffer 370, the processors 350 can identify to the output buffer the relative placement of the contexts within a packet. For example, the output buffer 370 may identify the first context of a packet with the start flag and continue to "buffer" the middle contexts of the packet until it receives the end context of the packet which it identifies with the stop flag. This enables the output buffer to reassemble the packet at its output interface prior to forwarding the packet off the processing engine. Significantly, the novel packet striping technique obviates the need for a buffer and queuing unit and its associated memories used to buffer incoming packets.

Figure 5:
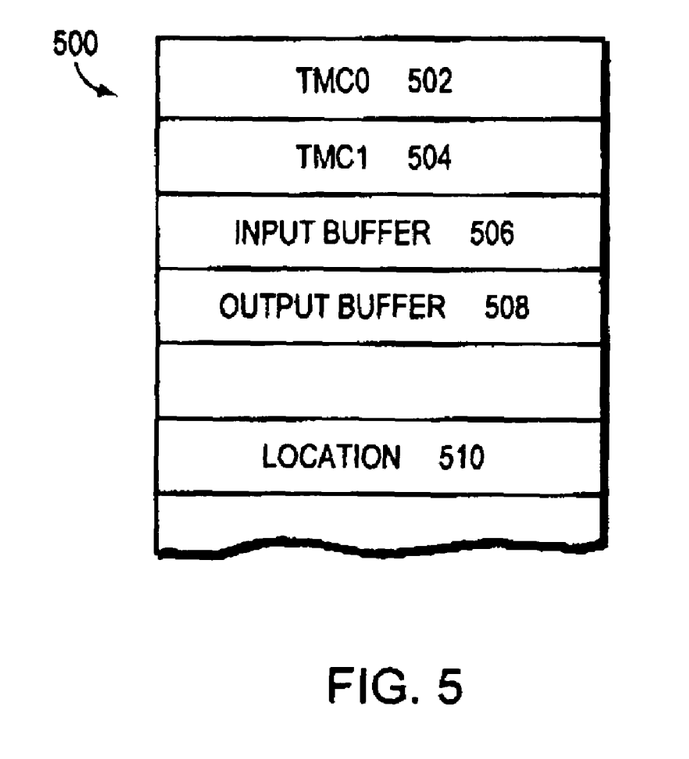
FIG. 5 is a schematic block diagram illustrating the organization of a context memory of a cluster that may be advantageously used with the present invention.

In accordance with another aspect of the present invention, the context memory 500 of a cluster may be controlled to enable packet insertions and deletions that essentially change the effective length of an output packet with respect to the input packet. Assume an incoming packet is apportioned into fixed-size contexts and distributed to the clusters of the processing engine. Because the context memories are larger than each fixed-size context, information stored within a section of the context memory may be "inserted" into the dedicated window accommodating a particular context to effectively increase the size of that context. Thereafter when reassembling the various contexts at the output buffer, the increased size of the context forms an effective length packet that is larger than the input packet.

FIG. 5 is a schematic block diagram illustrating the organization of a context memory 500 of a cluster. As noted, the context memory is 8 K bytes in length and the size of each window is 256 bytes. In the illustrative embodiment, a window buffer 502 is dedicated to TMC0, a window buffer 504 is dedicated to TMC 1, a window buffer 506 is used by the input buffer 360 and a window buffer 508 is used by the output buffer 370. The window buffer 506 dedicated to the input buffer is used to load a context into the context memory, whereas the window buffer 508 dedicated to the output buffer is used for transferring the processed context to the output buffer.

To expand the effective length of the output packet, available memory locations within the context memory are used. For example, a TMC processor may execute a command that specifies deleting a portion of the context stored in the window buffer 508 (i.e, the output buffer context) and, in its place, inserting (i.e., substituting) information stored at another location 510 of the context memory 500. Notably, this substituted information may be larger than (or smaller than) the deleted portion of the output buffer context. Thus, even though fixed sized contexts are loaded into the context memory from the input buffer, those contexts may not have a fixed size when they are provided to the output buffer after processing by the processors of a cluster.

While there has been shown and described an illustrative embodiment of a technique for striping packets across pipelines of a processing engine within a network switch, it is to be understood that various other adaptations and modifications may be made within the spirit and scope of the invention. For example, in an alternate embodiment, the window buffers of each context memory may be extended to a size that obviates packet striping. For example, most IP packets are less than 500 bytes and, in accordance with this aspect of the present invention, the window buffers may be extended to a size of, e.g., 1024 (1K) bytes. In this case, the packet does not have to be striped across multiple rows since it is adapted to fit within a single context.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for striping packets across pipelines of a processing engine within a network switch, the processing engine having a plurality of processors arrayed as pipeline rows and columns embedded between input and output buffers, the method comprising the steps of:
   including a context memory in each pipeline row;
   organizing the context memory as a plurality of window buffers of a defined size;
   apportioning each packet into contexts corresponding to the defined size associated with each window buffer by, segmenting the packet into fixed sized contexts at the input buffer;
   sequentially passing the contexts to the clusters; and
   storing the fixed sized contexts in appropriate window buffers of the context memories;
   correlating each context with a relative position within the packet to thereby facilitate reassembly of the packet at the output buffer, while obviating out-of-order issues involving the contexts of the packet;
   organizing the processors and context memory of each pipeline row as a cluster;
   changing the size of a fixed sized context at the context memory of a cluster;
   deleting a portion of the fixed sized context stored in the window buffer; and
   substituting the deleted portion of the context with information stored at another location of the context memory.

2. The method of claim 1 wherein the substituted information is one of larger than and smaller than the deleted portion of the fixed sized context.

3. A computer readable medium containing executable program instructions for striping packets across pipelines of a processing engine within a network switch, the processing engine having a plurality of processors arrayed as pipeline rows and columns embedded between input and output buffers, each pipeline row including a context memory, the processors and context memory of each pipeline row organized as a cluster, the executable program instructions comprising program instructions for:

organizing the context memory as a plurality of window buffers of a defined size;

apportioning each packet into contexts corresponding to the defined size associated with each window buffer;

correlating each context with a relative position within the packet to thereby facilitate reassembly of the packet at the output buffer, while obviating out-of-order issues involving the contexts of the packet;

segmenting the packet into fixed sized contexts at the input buffer;

sequentially passing the contexts to the clusters;

storing the fixed sized contexts in appropriate window buffers of the context memories;

changing the size of a fixed sized context at the context memory of a cluster;

deleting a portion of the fixed sized context stored in the window buffer; and substituting the deleted portion of the context with information stored at another location of the context memory.

4. A method for operating a network switch, comprising:

arraying a plurality of processors as a plurality of rows, a row forming a pipeline row the pipeline rows arrayed between an input buffer and an output buffer:

including a context memory in each pipeline row;

organizing the context memory as a plurality of window buffers of a defined size;

apportioning, by the input buffer, each packet into packet contexts, a packet context corresponding to the defined size associated with each window buffer; correlating each packet context with a relative position within the packet to thereby facilitate reassembly of the packet at the output buffer, deleting a portion of the fixed sized context stored in the window buffer; and substituting the deleted portion of the context with information stored at another location of the context memory.

5. A processing engine within a network switch, comprising:

means for arraying a plurality of processors as a row of a plurality of pipelines, the rows arrayed between an input buffer and an output buffer;

means for including a context memory in each pipeline row;

means for organizing the context memory as a plurality of window buffers of a defined size;

means for apportioning, by the input buffer, each packet into packet contexts, a packet context corresponding to the defined size associated with each window buffer;

means for correlating each packet context with a relative position within the packet, to facilitate reassembly of the packet at the output buffer;

means for deleting a portion of the fixed sized context stored in the window buffer; and means for substituting the deleted portion of the context with information stored at another location of the context memory.

* * * * *